(12) United States Patent
Woolworth et al.

(10) Patent No.: US 9,689,460 B2
(45) Date of Patent: Jun. 27, 2017

(54) DIAPER PIN VIBRATION DAMPER

(71) Applicant: Rohr, Inc., Chula Vista, CA (US)

(72) Inventors: Kevin Woolworth, San Diego, CA (US); Martin Channell, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 40 days.

(21) Appl. No.: 14/789,668

(22) Filed: Jul. 1, 2015

(65) Prior Publication Data

US 2017/0002892 A1 Jan. 5, 2017

(51) Int. Cl.
| | | |
|---|---|---|
| *F16B 39/04* | (2006.01) | |
| *F16F 15/08* | (2006.01) | |
| *F16B 39/10* | (2006.01) | |
| *B64D 29/06* | (2006.01) | |
| *F16F 1/36* | (2006.01) | |
| *F16B 21/14* | (2006.01) | |

(52) U.S. Cl.
CPC ............. *F16F 15/08* (2013.01); *B64D 29/06* (2013.01); *F16B 39/04* (2013.01); *F16B 39/10* (2013.01); *F16F 1/3605* (2013.01); *F16B 2021/14* (2013.01)

(58) Field of Classification Search
CPC ......... F16B 39/04; F16F 1/3605; F16F 15/08; B64D 29/06
USPC ........................................ 411/315, 316, 319
See application file for complete search history.

(56) References Cited

U.S. PATENT DOCUMENTS

| | | | |
|---|---|---|---|
| 710,795 A * | 10/1902 | Moser | F16B 39/04 |
| | | | 279/100 |
| 793,432 A * | 6/1905 | Geisel | F16B 39/04 |
| | | | 411/317 |
| 1,086,944 A * | 2/1914 | Shivers | F16B 39/04 |
| | | | 411/316 |
| 1,090,662 A | 3/1914 | Vilkie et al. | |
| 1,379,606 A * | 5/1921 | Ashley | F16B 39/20 |
| | | | 411/87 |
| 2,308,605 A | 1/1943 | Sylvia et al. | |
| 2,431,735 A * | 12/1947 | Cyr | F16B 39/20 |
| | | | 411/87 |
| 2,995,167 A * | 8/1961 | Williams | B25B 27/08 |
| | | | 411/316 |
| 3,203,301 A | 8/1965 | Faroni et al. | |
| 3,633,390 A | 1/1972 | Wartian | |
| 5,207,543 A | 5/1993 | Kirma | |
| 5,951,224 A * | 9/1999 | DiStasio | F16B 39/32 |
| | | | 411/115 |

(Continued)

FOREIGN PATENT DOCUMENTS

| | | |
|---|---|---|
| DE | 8535344 U1 | 3/1986 |
| DE | 8409080 U1 | 5/1988 |
| JP | 2002276635 | 9/2002 |

OTHER PUBLICATIONS

EP search report for EP16177640.6 dated Nov. 22, 2016.

*Primary Examiner* — Roberta Delisle
(74) *Attorney, Agent, or Firm* — O'Shea Getz P.C.

(57) ABSTRACT

Aspects of the disclosure are directed to a system configured for securing at least one component, the system comprising: a bolt head associated with a structural pin, a retention fitting, a diaper pin held in place by the retention fitting against turning, and a damper at least partially positioned between the bolt head and the diaper pin.

20 Claims, 2 Drawing Sheets

(56) References Cited

U.S. PATENT DOCUMENTS

| | | | | |
|---|---|---|---|---|
| 7,607,878 B2* | 10/2009 | Whipple | ............... | F16B 39/04 |
| | | | | 411/122 |
| 8,113,754 B2* | 2/2012 | Dahl | ............... | F16B 39/02 |
| | | | | 411/120 |
| D685,410 S * | 7/2013 | Chaput | ............... | D17/20 |
| 2007/0209496 A1* | 9/2007 | Lenzi | ............... | G10D 3/046 |
| | | | | 84/313 |
| 2009/0297290 A1* | 12/2009 | Hediger | ............... | F16B 33/006 |
| | | | | 411/120 |
| 2011/0296668 A1 | 12/2011 | Emmerich | | |
| 2012/0141226 A1 | 6/2012 | Jackson | | |
| 2013/0149068 A1* | 6/2013 | Jackson | ............... | F16B 39/04 |
| | | | | 411/315 |
| 2013/0328421 A1 | 12/2013 | Barkic et al. | | |

\* cited by examiner

DIAPER PIN VIBRATION DAMPER

BACKGROUND

Referring to FIG. 1, a system assembly 100 is shown that is used to hold/secure one or more components in place. For example, a structural pin/bolt 102 may be used to hold at least some of the components to a structure. In turn, this structural pin 102 is secured in place with a quick-release anti-torque pin (frequently referred to as a diaper pin) 106 that self-secures in place.

The diaper pin 106 fits loosely and is potentially subject to rattling/vibration. The rattling can potentially lead to wear of the pin 106 if it rubs excessively due to the vibration against a retention housing or a bolt head. This wear can lead to a reduction in the lifetime of the assembly 100, causing the assembly 100 to be subjected to frequent inspection or maintenance activities.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system configured for securing at least one component, the system comprising: a bolt head associated with a structural pin, a retention fitting, a diaper pin held in place by the retention fitting against turning, and a damper at least partially positioned between the bolt head and the diaper pin. In some embodiments, the damper includes a slot that allows the damper to be slid onto the diaper pin. In some embodiments, the slot is substantially located near the center of the damper. In some embodiments, the damper is configured to allow the damper to be coupled to the diaper pin using a plurality of different orientations of the damper relative to the diaper pin. In some embodiments, the damper includes an elastomeric material. In some embodiments, a region of the damper between the structural pin and the diaper pin is configured to compress when the diaper pin is hooked closed. In some embodiments, the at least one component is associated with a nacelle of an aircraft. In some embodiments, the system is configured to secure the at least one component to a pylon of the aircraft.

Aspects of the disclosure are directed to a damper made of an elastomeric material that is configured to be coupled to a diaper pin of an assembly associated with a nacelle of an aircraft. In some embodiments, the damper is substantially block-like in shape. In some embodiments, a region of the damper between a structural pin and the diaper pin is configured to compress when the diaper pin is hooked closed to reduce a vibration associated with the diaper pin.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
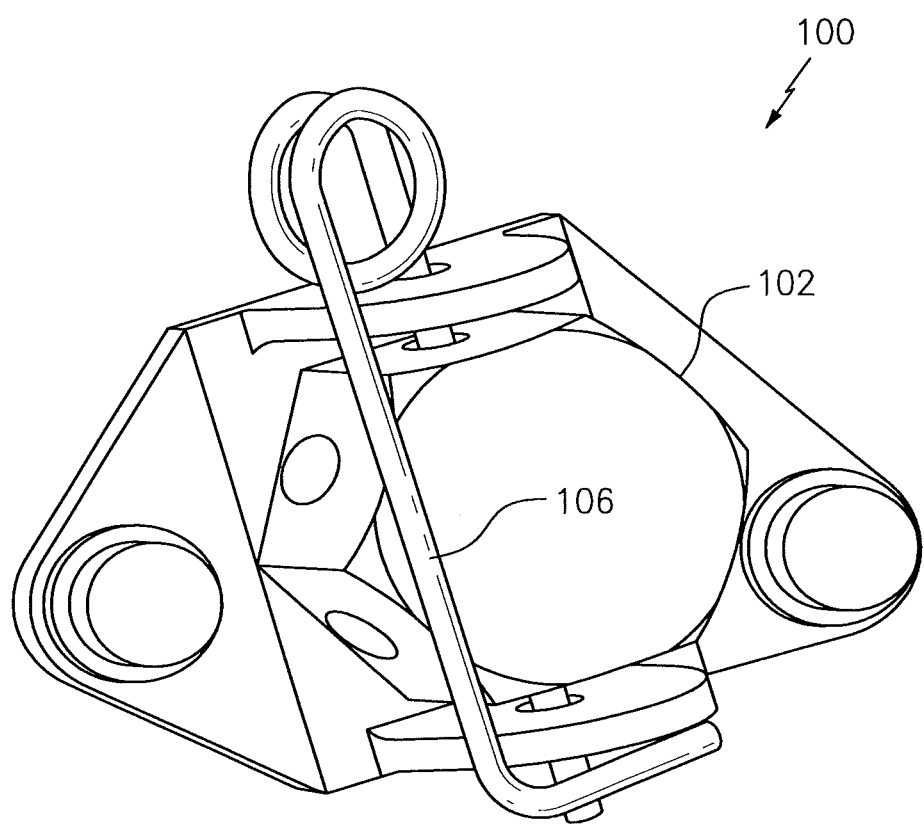
FIG. 1 illustrates a system assembly for securing a component of a nacelle of an aircraft to a pylon of the aircraft in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more components may refer to a direct connection or an indirect connection. An indirect connection may incorporate one or more intervening components.

Aspects of the disclosure are directed to a reduction/minimization of wear associated with an anti-torque pin that is employed as part of a nacelle of an aircraft. The anti-torque pin is frequently referred to as a diaper pin, and the terms anti-torque pin and diaper pin are used interchangeably herein. In some embodiments, a damper is coupled to the diaper pin. The damper may reduce/eliminate vibration that might otherwise be experienced by the diaper pin.

Figure 2:
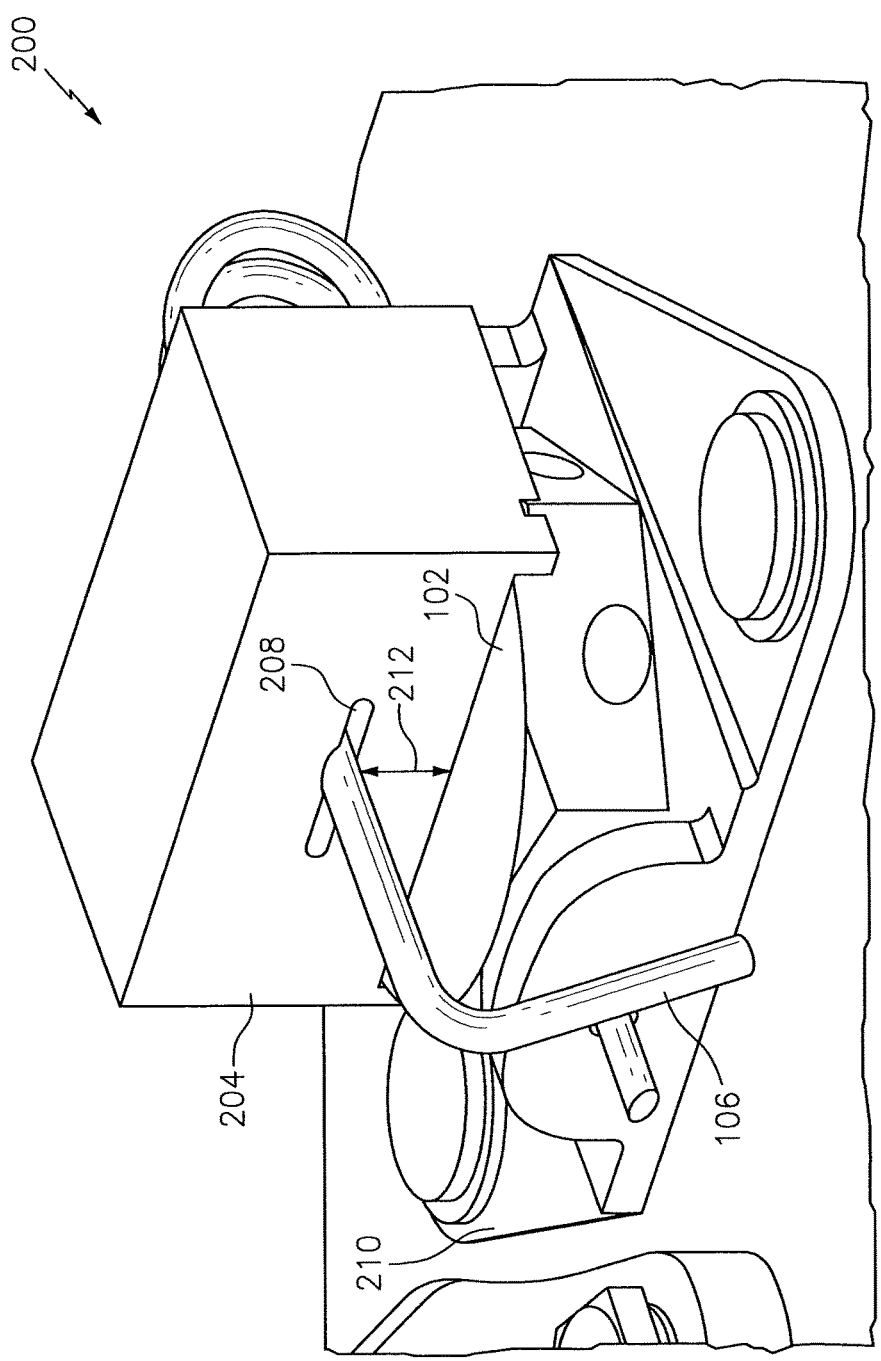
FIG. 2 illustrates a system assembly for securing a component of a nacelle of an aircraft to a pylon of the aircraft in accordance with aspects of the disclosure.

Referring to FIG. 2, a system assembly 200 is shown. The assembly 200 includes many of the devices described above in connection with the assembly 100 of FIG. 1, and so, a complete re-description is omitted for the sake of brevity. In contrast to the assembly 100, the assembly 200 may include a damper 204. The damper 204 may be made of one or more materials, such as for example an elastomeric material. The material(s) used in the manufacture/fabrication of the damper may be based on one or more requirements, such as for example environmental requirements (e.g., a specification of a temperature range) in which the assembly 200 is to be used/operated.

As shown in FIG. 2, the damper 204 may include a slot/slit 208 that may be used to slide the damper 204 onto the diaper pin 106. When the diaper pin 106 is hooked closed the damper 204 may be compressed in a region (denoted by arrows 212) of the damper 204 between the structural pin 102 and the diaper pin 106. This compression of the damper 204 may minimize/prevent the diaper pin 106 from rattling/vibrating in retention holes (not shown) in a retention fitting 210 and/or a securing hole (not shown) in the structural pin 102. Accordingly, the damper 204 may prevent the diaper pin 106 from wearing through the retention fitting 210 by not allowing the diaper pin 106 to vibrate.

While the use of a slot/slit 208 is shown in FIG. 2, such a feature is optional. Any other technique for providing a damper 204 (or associated, compressed material) between the structural pin 102 (or associated bolt head) and the diaper pin 106 to apply a force to the diaper pin 106 and hold it steady against vibration may be used. The material above the diaper pin 106 in FIG. 2 may be optional.

A profile/form-factor that is used for the damper 204 may be based on one or more requirements/specifications. In the exemplary assembly 200, the damper 204 is shown as being substantially block-like in shape with the slot 208 being substantially located near the center of the damper 204. A size/dimension of the slot 208 may be based on a size/dimension associated with the diaper pin 106.

The distance associated with the arrows 212 in connection with the damper 204 (or associated material) may be selected/configured such that the damper 204 will compress when the diaper pin 106 is installed. A bottom surface of the damper 204 that interfaces/couples to the structural pin 102 (or associated bolt head) may be secured without sliding off or turning/twisting In some embodiments, the profile/form-factor for the damper 204/slot 208 may be selected to facilitate a "foolproof" assembly of the damper 204 and the diaper pin 106. For example, the profile of the damper 204/slot 208 may be such that the damper 204 may be configured to be coupled to (e.g., slid onto) the diaper pin 106 using a plurality of different orientations of the damper 204 relative to the diaper pin 106.

While exemplary embodiments of this disclosure have been described above in connection with a nacelle of an aircraft, aspects of the disclosure may be applied in connection with other systems or devices associated with the aircraft. Still further, aspects of the disclosure may be used in a variety of application environments, such as for example marine applications, automotive applications, etc.

Technical effects and benefits of the disclosure include an extension of a lifetime associated with one or more components of an assembly. In some embodiments, such an extension of the lifetime may be facilitated by a reduction/minimization of wear experienced by such components.

Aspects of the disclosure may be used to provide an interface in connection with one or more pins. For example, a pin may be configured to interface with a bolt head. A turning of the bolt head may shear the pin, but the pin may be designed to withstand the shear force and prevent the bolt from turning.

In accordance with aspects of the disclosure, a pin may be supported in a retention fitting. The retention fitting may provide support to the pin on one or both sides of a bolt head. The retention fitting may be secured to structure to serve as a fixed device.

In some embodiments, a pin may include a retention feature, such as for example a bend at the end of the pin, so that the pin will not fall out. The retention feature may be biased to facilitate removal, such as for example manual removal by a technician.

Aspects of the disclosure may be used in connection with a nacelle of an aircraft. For example, aspects of the disclosure may be used to secure one or more components associated with the nacelle. In some embodiments, a component may be secured to a pylon of an aircraft. Such aspects may be used to provide a secure attachment in view of the vibration that may be experienced during operation of the aircraft.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

We claim:

1. A system configured for securing at least one component, the system comprising:
   a bolt head associated with a structural pin;
   a retention fitting;
   a diaper pin held in place by the retention fitting against turning; and
   a damper at least partially positioned between the bolt head and the diaper pin.

2. The system of claim 1, wherein the damper includes a slot that allows the damper to be slid onto the diaper pin.

3. The system of claim 2, wherein the slot is substantially located near the center of the damper.

4. The system of claim 1, wherein the damper is configured to allow the damper to be coupled to the diaper pin using a plurality of different orientations of the damper relative to the diaper pin.

5. The system of claim 1, wherein the damper includes an elastomeric material.

6. The system of claim 1, wherein a region of the damper between the structural pin and the diaper pin is configured to compress when the diaper pin is hooked closed.

7. The system of claim 1, wherein the at least one component is associated with a nacelle of an aircraft.

8. The system of claim 7, wherein the system is configured to secure the at least one component to a pylon of the aircraft.

9. The system of claim 1, wherein the damper is configured with a through-aperture that receives the diaper pin.

10. The system of claim 9, wherein the through-aperture is located near a vertical and lateral center of the damper.

11. The system of claim 1, wherein the damper is configured to completely circumscribe a portion of the diaper pin.

12. The system of claim 1, wherein the diaper pin is operable to longitudinally contact opposing side portions of the retention fitting, wherein the bolt head is longitudinally between the opposing side portions of the retention fitting.

13. The system of claim 1, wherein the bolt head comprises a hexagonal bolt head.

14. The system of claim 1, wherein the retention fitting comprises a flange configured to provide a rotational stop for the bolt head, and wherein the diaper pin is mated with an aperture in the flange.

15. A damper made of an elastomeric material that is configured to be coupled to a diaper pin of an assembly associated with a nacelle of an aircraft.

16. The damper of claim 15, wherein the damper is substantially block shaped.

17. The damper of claim 15, wherein a region of the damper between a structural pin and the diaper pin is configured to compress when the diaper pin is hooked closed to reduce a vibration associated with the diaper pin.

18. The damper of claim 15, wherein the damper is configured with a through-aperture operable to receive the diaper pin.

19. The damper of claim 18, wherein the through-aperture is located near a vertical and lateral center of the damper.

20. The damper of claim 15, wherein the damper is configured to completely circumscribe a portion of the diaper pin.

* * * * *